(12) United States Patent
Heintzen et al.

(10) Patent No.: US 7,079,968 B2
(45) Date of Patent: Jul. 18, 2006

(54) MEASURING SYSTEM (75) Inventors: Dirk Heintzen, Weisendorf (DE); Andreas Nithammer, Neuenrade (DE)

(73) Assignee: AFT Atlas Fahrzeugtechnik GmbH, Werdohl (DE)

( * ) Notice: Subject to any disclaimer, the term of this patent is extended or adjusted under 35 U.S.C. 154(b) by 179 days.

(21) Appl. No.: 10/804,590

(22) Filed: Mar. 19, 2004

(65) Prior Publication Data

US 2004/0186652 A1    Sep. 23, 2004

(30) Foreign Application Priority Data

Mar. 21, 2003   (DE) ............................... 103 12 572

(51) Int. Cl.
*G06F 19/00* (2006.01)
*G01M 15/00* (2006.01)

(52) U.S. Cl. .................... 702/94; 73/117.3; 123/90.17; 702/95

(58) Field of Classification Search ............ 702/94–96, 702/145–151; 701/29, 35, 101; 73/116, 73/117.3; 123/90.17
See application file for complete search history.

(56) References Cited

U.S. PATENT DOCUMENTS

| 4,301,678 | A  | * | 11/1981 | Full et al. ...................... 73/116 |
| 6,283,075 | B1 |   | 9/2001  | Schaifer et al. .......... 123/90.17 |
| 6,289,862 | B1 |   | 9/2001  | Schaifer et al. .......... 123/90.17 |
| 6,564,623 | B1 | * | 5/2003  | Zanetti ....................... 73/117.3 |

FOREIGN PATENT DOCUMENTS

| DE | 198 08 618 | 9/1999 | .............. 123/90.17 |
| DE | 198 08 619 | 9/1999 | .............. 123/90.17 |

* cited by examiner

*Primary Examiner*—Bryan Bui
*Assistant Examiner*—John Le
(74) *Attorney, Agent, or Firm*—Davidson, Davidson & Kappel, LLC (57) ABSTRACT

A method for increasing the measuring accuracy for a limited path is described, where a map of the actual geometric path that is stored in a memory is obtained in a "learning phase." In addition, a method for better controlling a camshaft offset in a combustion engine is described.

37 Claims, 4 Drawing Sheets

MEASURING SYSTEM

This claims priority to German Patent Application No. 103 12 572.8, filed Mar. 21, 2003 and hereby incorporated by reference herein.

BACKGROUND

The present invention relates to a method for increasing the measuring accuracy for a limited path using a measuring system.

A sensor for scanning a scale in order to measure a relevant distance or a position along a path is known from the related art—for example from three-coordinate measuring machines. Since the scale is in the form of a ruled grid, after such a measuring machine is turned on, the sensor must first move to a zero position, at which the applicable coordinates in a counter and/or a display device are then set to zero. If the measuring machine now travels in the direction of this coordinate, the lines of the scale—known as path events—are counted. Since the lines of the grid generally do not correspond to the usual specification in millimeters, the electrical signal of the sensor is converted into the applicable unit.

Measuring by using a grid or line scale is in some cases not merely counting off these lined bars. For example, there is the method that by using a second lined bar that moves together with the measuring device, a moiré pattern is created. This moiré pattern is then interpreted by the sensor and fed to a converter which converts it into the applicable unit of measurement.

In order to achieve high precision with the measuring systems from the related art, high accuracy of the scale is also always necessary. Naturally the accuracy of a sensor also plays a part, but no matter how precise a sensor may be, without a precise scale—which embodies a measuring system—precise measuring is not possible.

BRIEF SUMMARY OF THE INVENTION

An object of the present invention is to provide a method and a measuring system in which a greater measuring accuracy may be achieved without increasing the accuracy of the scale.

The present invention provides that at least one learning phase precedes the measuring. In this learning phase—as during the later measuring—a sensor and a scale are moved relative to each other, in which process the sensor generates electrical signals as it passes path events. These path events may be lines or bars situated at right angles to the direction of measurement, as in the related art. However, the deciding factor for the present invention is that not only the number of path events is measured, but that also, at least initially, their time interval is also recorded. In this case, this time interval is a function of the corresponding speed with which the sensor and the scale move relative to each other during the learning phase. The tracing speed may be calculated by a program in a digital controller, when the total distance and the time it requires are known.

Thus in the present invention geometric intervals between path events of a path are used to prepare a map which is then stored in a digital memory of this measuring system. Later during measuring this map is converted to a measured path.

It is important within the framework of the present invention that the measuring system only has to provide information about a limited path, because the measuring system according to the present invention is only able to provide information about a path that it has previously "learned." In the present invention, a limited path means not only a straight stretch, but rather a limited path is also the circumference of a wheel, for example a trigger wheel which is positioned on a crankshaft or camshaft in order to provide rotation and angle information. Although a measuring signal would not stop after one revolution of a trigger wheel because the next revolution is beginning, a rotating trigger wheel nevertheless represents a limited path, because the limited circumference of a trigger wheel later represents only a cyclical repetition of the same. For a number of path events of a particular trigger wheel equal to n, another cycle begins after n pulses.

The map of actual geometric intervals of the path events according to the present invention may for example result from the case where, during tracing of the scale at a defined speed or a speed profile, the actual time interval between the events is stored in the digital memory. Based on the additional information in the memory about the speed at which the measurement was done, it is then possible during measuring—possibly at a different measuring speed—to convert from the current time interval between the path events into the measured path.

The increase in measuring accuracy works because it is simple to achieve a time signal of the highest precision. It is not important here according to the present invention that the time signal may actually represent seconds or hundredths of a second, but that any desired number of time units is possible, and that these time units also do not lose their accuracy over time. For example, a quartz-crystal oscillator—having a pulse frequency of one megahertz, for example—represents a time signal that ensures a constant time signal if this quartz-crystal oscillator is of the proper quality.

In another embodiment of the present invention, the map of the actual geometric intervals of the path events result from the case where the interval traveled is calculated from the speed of travel and the time required between path events. To permit conversion to an interval traveled, in the case of a straight path the number of path events on the limited path is required. The digital memory of the measuring system thus contains values in millimeters or, in the case of a round path, in degrees of angle.

For the method according to the present invention, it is not important during the measuring step whether the actual geometric intervals provide a map that is characterized by time intervals or distance intervals, because when determining the measured interval, conversion to a distance unit is performed according to which character the geometric representatives of the map have.

In the course of increasing the measuring accuracy according to the present invention, the map of the actual geometric path may be stored in the digital memory by the intervals between path events, or the map may also be made up of actual geometric intervals, which are always measured starting from the first path event.

According to the present invention, the individual values that are stored in the memory do not necessarily need to be stored in the order of the intervals between the path events. In other words, the interval between the first two path events does not need to be stored in memory location 1, the interval between the second and third path events in memory location 2, etc. The order in which the values are stored may also be for example that which is most favorable for the interpreting algorithm. The butterfly algorithm may be noted here as representative for an interpreting algorithm. With this algorithm, values are assigned by bit inversion of its indices.

The method according to the present invention not only makes it possible to determine that the interval between two path events is perhaps not constant, but the interval itself is determined—as already described—and is stored as a time or length value or a number of pulses. Since information is available about every interval or leg between path events because of the learning phase, and this information is stored in an order that permits reconstruction of the order of the actual geometric path, the sequence produces a model of the entire path segment. This path segment is made up—at least in part—of values of varying magnitude. Using a search algorithm that is implemented by a digital program, it is possible then to determine from this map an individual value that occurs only a single time.

Through the sequence of the values in the memory, a digital mark is then assignable to this value. This mark then stands as it were for a "milestone" on this path segment. Because this value occurs only once, it is clearly identifiable when compared with repeatedly arriving new values. However, according to the present invention, a search algorithm may also search for a sequence of values in the memory. A sequence of values corresponds to a certain pattern. A sequence of values is determinable more quickly and clearly than a single value, because each individual value has a small probability of its own, and an even much smaller probability in combination with other values. A sequence of values here does not have to be made up of adjacent values, but may also be defined by any pattern. A digital mark may also be assigned to a sequence of digital values, in which case this mark is assignable to any value in this sequence, or to any other value. All that is important here is that the interval—i.e., the number of indices—to one of the values in the sequence is known to the digital program.

It has already been explained that the map of the actual geometric intervals between the path events is determined using a defined speed profile. This defined speed profile may be a constant speed over the entire interval. The defined speed profile in the learning phase or later during measuring may also be characterized by a constantly rising or falling speed, however. A constantly rising speed may occur for example if the limited path is embodied by a trigger wheel which is positioned on a crankshaft. For example, if an internal combustion engine is started or accelerated in some other way, the rotational speed logically increases, and thus time intervals of one and the same point on the trigger disk become shorter and shorter as the number of revolutions of the trigger wheel increases. It is possible to determine the particular time interval for one revolution of the trigger wheel through the information about the number of path events on the circumference of the trigger wheel, i.e., through the number of teeth on the trigger wheel, and from this to calculate the corresponding rotational speed. From this, in combination with a constant time signal, it is possible to determine the particular speed profile during the measurement, which makes it possible to calculate back to a constant speed profile, or even to angle values. It is evident from this example that an increase in rotational speed, but also a reduction in rotational speed—i.e., a non-constancy in measuring procedures—does not represent a problem for increasing the measuring accuracy according to the present invention. If an acceleration or deceleration process is not linear, according to the present invention this is not a problem for obtaining a defined speed profile, because for a number n of revolutions of a trigger wheel, for example, an $n-1^{th}$ degree function of the speed change may be calculated.

When straight paths are measured, there is no cyclical measuring process as just described in connection with a trigger wheel. In order to produce a defined speed profile here, a drive unit for example that brings about the motion of the sensor and scale relative to each other is precisely triggered. This may be carried out for example by controlling the current for the electric motor in a defined way over time. It is helpful here with both rotational and translational paths that the measuring systems also always have a mass, so that the inertia of this mass makes "shaky" natural movements impossible. This results in uniform movement behavior, which in turn increases the measuring quality. Since the measuring method according to the present invention uses electrical signals, for example using a Hall sensor and a trigger wheel, the initial result is an analog signal. This analog signal is then made up here of a rising arc, which then drops off steeply and continues in an arc below the time axis. The lower arc is essentially centrosymmetrical with the upper arc. Analog signals may be interfered with by a great many types of disturbance, however—such as superimposed higher frequencies. It may therefore be advantageous to first subject the analog signal to electronic postprocessing. This postprocessing may be low-pass filtering, for example. In another advantageous embodiment of the present invention, the electrical signal may be converted to a square-wave signal. The flanks of the square wave signal would then advantageously be at the points in time where the analog signal intersects the time axis at a steep angle.

Additional advantageous forms of the present invention relate to the stored values of the map in the digital memory. In a first form, the values obtained are obtained a single time and then stored permanently in the digital memory. The digital memory here may be an EPROM component. In another embodiment the stored values are stored in the memory in a deletable manner. This deletable storage may be done either by having the memory be an electrically erasable memory (that is, an EEPROM), or else this memory is a simple memory and loses its information when the system is switched off. In another embodiment, the learning phase is not limited to the one-time process, but rather the learning phase is performed again and again—possibly even sporadically—with the result that as time goes on it is possible to determine more and more exact values of the scale. When a more exact value has been obtained, this value may be assigned to its memory location, whereby it overwrites the old value.

In another embodiment of the present invention, a learning phase occurs each time the measuring system is restarted. This may be beneficial if the path events are able to shift or change over time. In addition, a learning phase is necessary at each restart if the digital control has no memory elements that are able to preserve these values even after a loss of power.

In one embodiment of the present invention, the path events are placed against the scale randomly. This has the advantage that a pattern of intervals that exists from one segment to another really only occurs one time, and may thereby be assigned clearly. In another embodiment of the path events on the scale, the intervals are consistently decreasing or consistently increasing. This means that for example from the beginning of a scale to its end, the intervals between two path events either increase or decrease with each segment of the path. This ensures that the interval between two path events is only able to occur once, so that a clear position on the limited path, i.e., a "milestone," is created.

However, it is also possible to implement devices with the method according to the present invention. In a first device, the limited path is in the form of a straight interval segment. If the path events are implemented for example in consistently decreasing or consistently increasing geometric intervals, it is possible after a short relative movement of the sensor and scale over two path events for an electronic element to immediately recognize its present position on the path when values are stored from a learning phase. Hence an interval sensor of this sort is in fact an absolute interval sensor. An absolute interval sensor of this sort may be used advantageously in a control for an electronic clutch management system on a motor vehicle. Because of the presence of an absolute interval sensor, prior calibration is eliminated in this application, because the displacement mechanism travels to a starting and ending stop position. An absolute interval sensor according to the present invention has the advantage that if there is a system failure of the electronic clutch management system due to a power failure, the interval information is available again immediately after the power supply is restored.

In another device, the limited path is in the form of a trigger wheel, and consequently as a full circle, and together with the sensor constitutes a rotational angle sensor. Here the trigger wheel is positioned for example on a crankshaft and/or camshaft of an internal combustion engine. If signals from both the crankshaft and the camshaft are detected, and if at least one digital mark is defined for each of these signals, it is possible to detect not only the rotational speed, but also the relative angle between the camshaft and the crankshaft when there is an offset of the camshaft. Since a crankshaft in an internal combustion engine makes twice as many revolutions than a camshaft, only every second mark of the camshaft may be evaluated when the relative angle of rotation between the camshaft and the crankshaft is measured.

BRIEF DESCRIPTION OF THE DRAWINGS

The present invention will now be explained in greater detail on the basis of the figures, in which.

DETAILED DESCRIPTION

Figure 1:
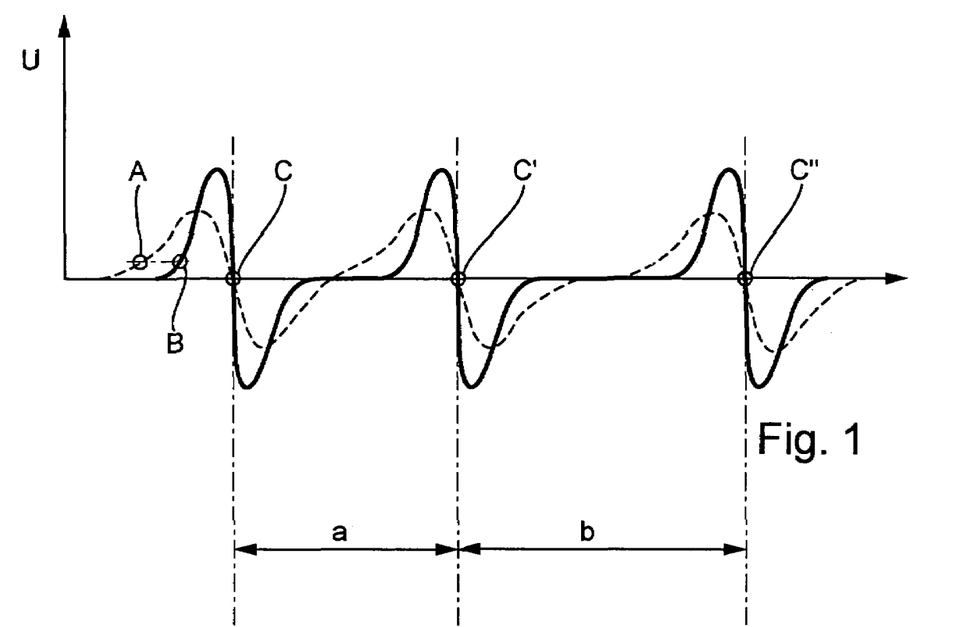
FIG. 1 shows a detail from an analog trigger signal.

FIG. 1 shows an analog signal. The horizontal axis corresponds to the time axis, and the vertical axis here shows the voltage amplitude. The continuous line shows the variation of the voltage over time at a relatively high speed. The dashed curve of a trigger signal is the one that occurs at a lower speed. It is noted here that at a higher speed—i.e., at a higher relative speed of a trigger sensor relative to physical trigger marks—the voltage excursions are significantly greater. It is also noted that at the higher speed the areas between the curve and X axis also become narrower. These trigger signals are also characterized by the fact that they are centrosymmetrical relative to points C, C' C".

Figure 2:
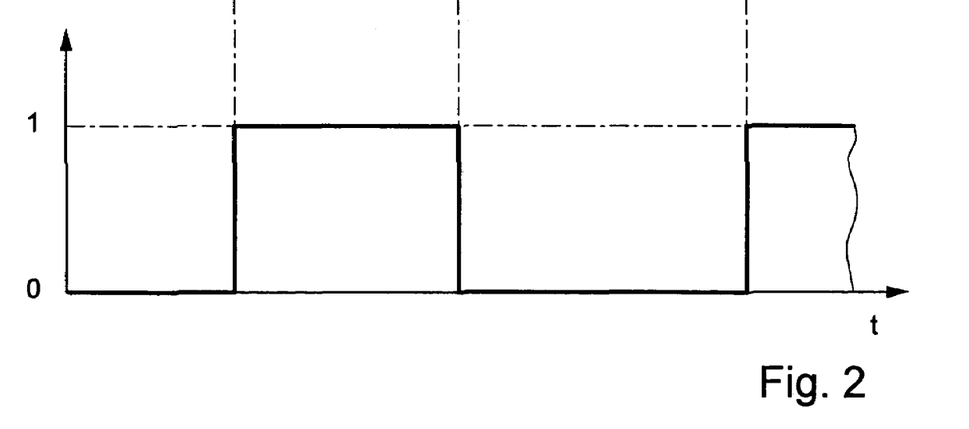
FIG. 2 shows a detail from the digitized signal of FIG. 1.

If one were to use a voltage level like that indicated for example at points A and B in FIG. 1 as the basis when converting the analog trigger signal to a digital signal, as may be seen in FIG. 2, the result would be for example a shift of point A in the direction of B or even beyond when the speed is increased. Points A or B would thus cause a shift of the trigger point. It is therefore advantageous for the trigger point for digitizing the analog signal to be at points C, C' and C". These points are characterized by the fact that there is a zero crossing of the X axis (t axis) by the analog signal. No shifting of the trigger points occurs.

It is clearly visible in FIG. 2 that the square-wave function shown there is characterized by vertical flanks. It is also recognizable that intervals a and b differ. This was chosen intentionally in the illustration in FIG. 2 in order to clearly point out the irregularity of digital signals—in particular of digital trigger signals.

Figures 3, 4:
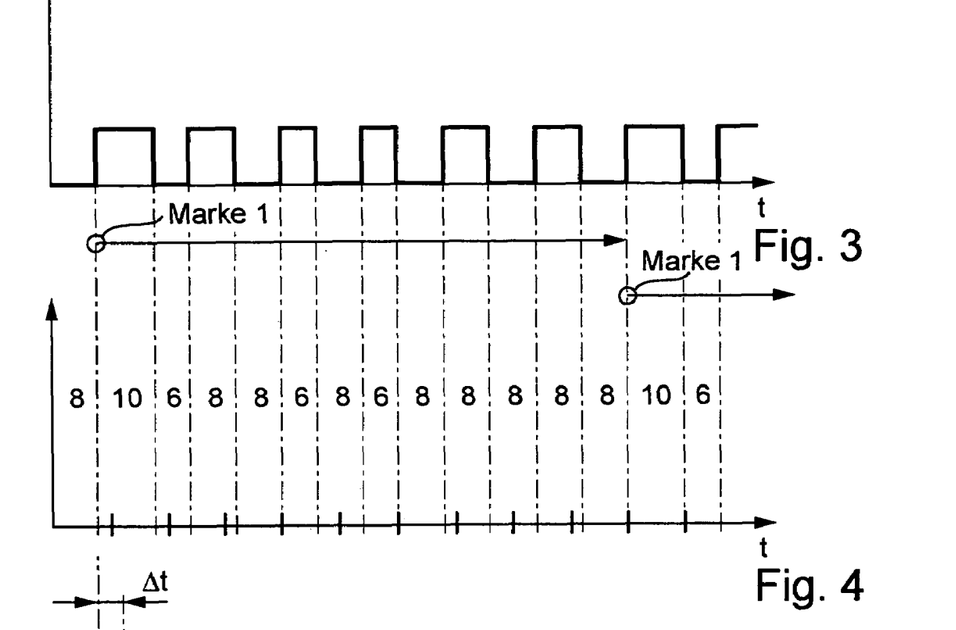
FIGS. 3, 4, 5 and 6 show a comparison of two trigger signals.
Figure 5:
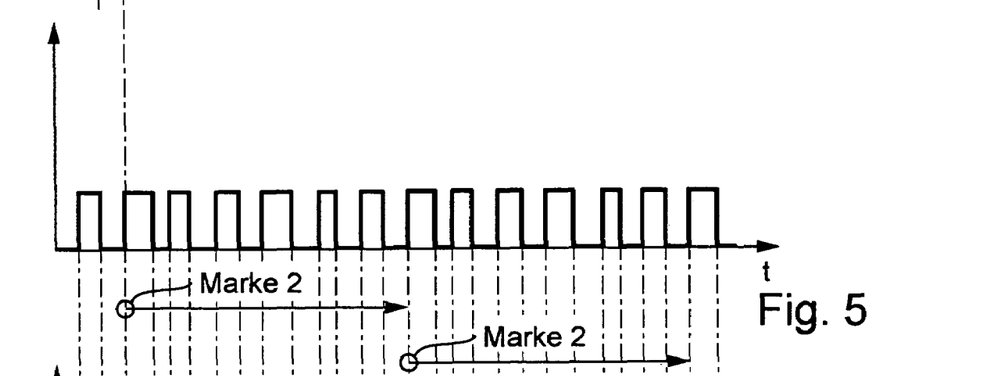
Figure 6:
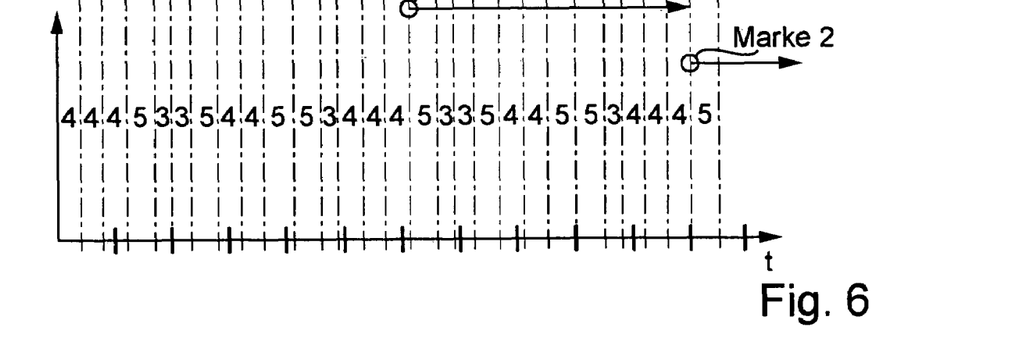

FIGS. 3 through 6 illustrate a digital trigger signal which is greater than a full cycle. FIG. 3 for example shows a digital trigger signal of a camshaft, while FIG. 5 illustrates the associated digital trigger signal of a crankshaft. Since the crankshaft runs twice as fast in a 4-stroke internal combustion engine as the camshaft, the trigger signals in FIG. 5 are therefore twice as close as in the case of the camshaft. The assumption in this discussion is that the crankshaft and the camshaft have trigger wheels that have the same number of teeth. FIGS. 4 and 6 each show a true time axis, in order to be able to read better that the square-wave functions are unevenly formed. The interval between two division marks on time axis t in FIGS. 4 and 6 has been assumed to be 10 milliseconds for the explanation of the invention. It is true that a more realistic interval between the time marks would more likely be in the area of one millisecond, but then the numbers entered that are intended to represent time intervals between the dashed lines would be numbers of inconvenient length. An interval 8, as may be seen at the left edge of FIG. 4, or a number 4 as may be seen at the left edge of FIG. 5 is easer to read in the figure than a number 0.8 or 0.4.

If one now considers the time intervals between the dashed vertical lines in FIG. 3, one can find that the trigger signals—in this example—vary between the values 6 and 10. If one wishes to get by without an additional sensor on the trigger disk, it is advantageous to be able to recognize a certain pattern from the sequence of smaller and larger intervals, so that a certain point in this pattern—for example the beginning or the end—is viewed as a virtual mark on the trigger wheel. In the example in FIG. 3, one might for example choose the interval 10 as the mark, since this value occurs only once in a cycle. However, one could also define the pattern—which forms interval 8 and interval 10—as the mark.

In FIG. 6, i.e., the digital signal curve of the exemplary crankshaft, a sequence of intervals with the values 4 and 5 is not sufficiently unambiguous, because in approximately the middle range of a cycle (corresponding to the length of the arrow) the sequence of intervals 4 and 5 recurs once more, without the cycle ending there. However the pattern 4-4-5, as may be seen at the left edge of FIG. 6, represents an unmistakable pattern, so that this point, for example a point between 4-4 and 5 of the pattern, may be chosen as mark 2.

To give a digitized trigger signal greater accuracy, it is advantageous for the sequence of narrower and wider intervals to be "learned" by a control logic unit. Through this "learned" pattern of a sequence of signals, which recurs cyclically again and again in connection with trigger wheels after one revolution of the trigger wheel, a controller may respond for example not only to the flanks, but in fact the controller even has the information about how exact or inexact the flanks are. Through the knowledge of the exact or inexact signal curve, it is also advantageous that it is now also possible to determine numerical values that lie between the flanks. For example, if a trigger wheel only has 100 trigger flanks in one revolution, a maximum resolution of 3.6 degrees is possible.

It was already indicated in connection with FIGS. 3 through 6 that the signals here come from two trigger wheels of identical construction which are positioned on a crankshaft and a camshaft. In high-end internal combustion engines there is sometimes a camshaft offset. This means that depending on the speed of the crankshaft and the associated gas exchange problems in the cylinder the camshaft is offset relative to the crankshaft by an angle of 40 to 80 degrees of the crankshaft. For this offsetting technology it is important that one receives feedback about the offset. According to the present invention this is possible in that a mark is sought both in the digitized trigger signal of the crankshaft and in the digitized signal of the camshaft, and the angular offset between these two marks is then determined. Since the crankshaft turns twice than fast as the camshaft, it is important that mark 2 of the crankshaft is taken into account only every second time. This determination of the relative angle position between marks 1 and 2 then takes place preferably at a camshaft position at which it has not yet been offset relative to the crankshaft. After the described learning phase—including the learning phase in regard to the relative angle between mark 1 and mark 2, which may also be expressed as a Δt—the offsetting of the camshaft may take place.

Figure 7:
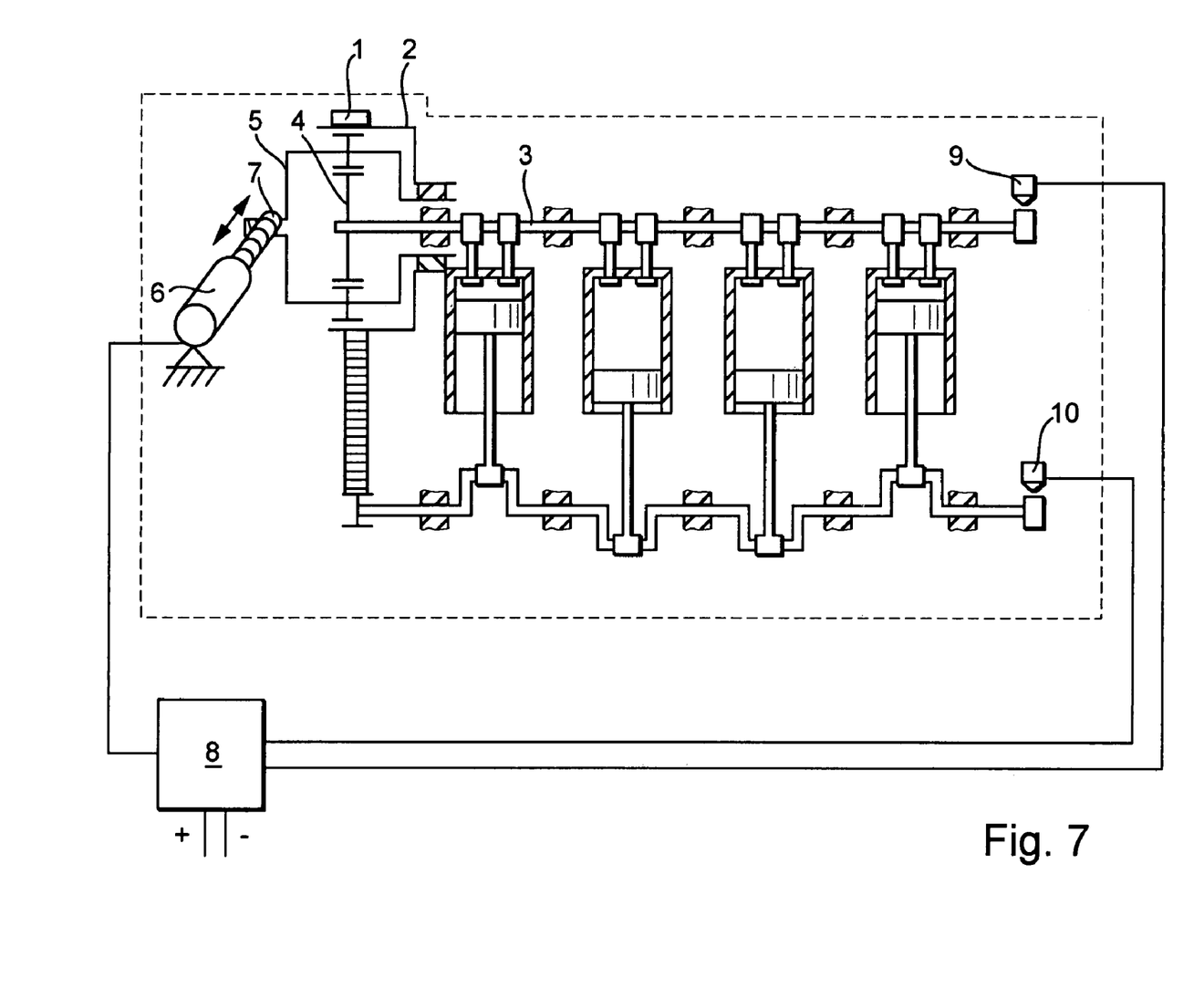
FIG. 7 shows a camshaft offset by means of a mechanically adjustable planetary gear.

The camshaft may be offset for example using a planetary gear. One embodiment of the present invention relates to a device for continuous phase offset of the shaft relative to its drive. FIG. 7 shows a camshaft of an internal combustion engine whose angular position (phase) is offset relative to the crankshaft. The camshaft may be driven by a chain or a toothed belt. In FIG. 7, toothed belt 1 or the chain drives the ring gear 2 of a planetary gear. Camshaft 3 is connected to inner gear wheel 4 of the planetary gear, the sun gear. The planet gear carrier, i.e., link 5, is connected by a device 7 to a fixed-location positioning drive 6, for example an electric motor. Device 7 may be for example a gear wheel or worm drive or a lever. The positioning drive 6 may be self-locking. Due to the design of the planetary gear, the ring gear 2 and sun gear 4 rotate at a certain speed ratio with respect to each other. This does not change as long as the link is unable to turn because of the self-locking of the positioning drive or because the positioning drive actively retains its position. Now if the positioning drive 6 receives a triggering signal from electronic controller 8, which evaluates the signals from camshaft sensor 9 and crankshaft sensor 10 among others for its calculations, and turns the link in one direction or the other, during this time the speed of the sun gear 4 changes; it becomes faster or slower depending on the direction the link is turning. It thus speeds ahead of or lags behind its previous angular relationship to the ring gear 2, and the phase position changes. If the positioning drive 6 stops the link in the new position, the old speed ratio is restored, although in the new phase position.

Figure 8:
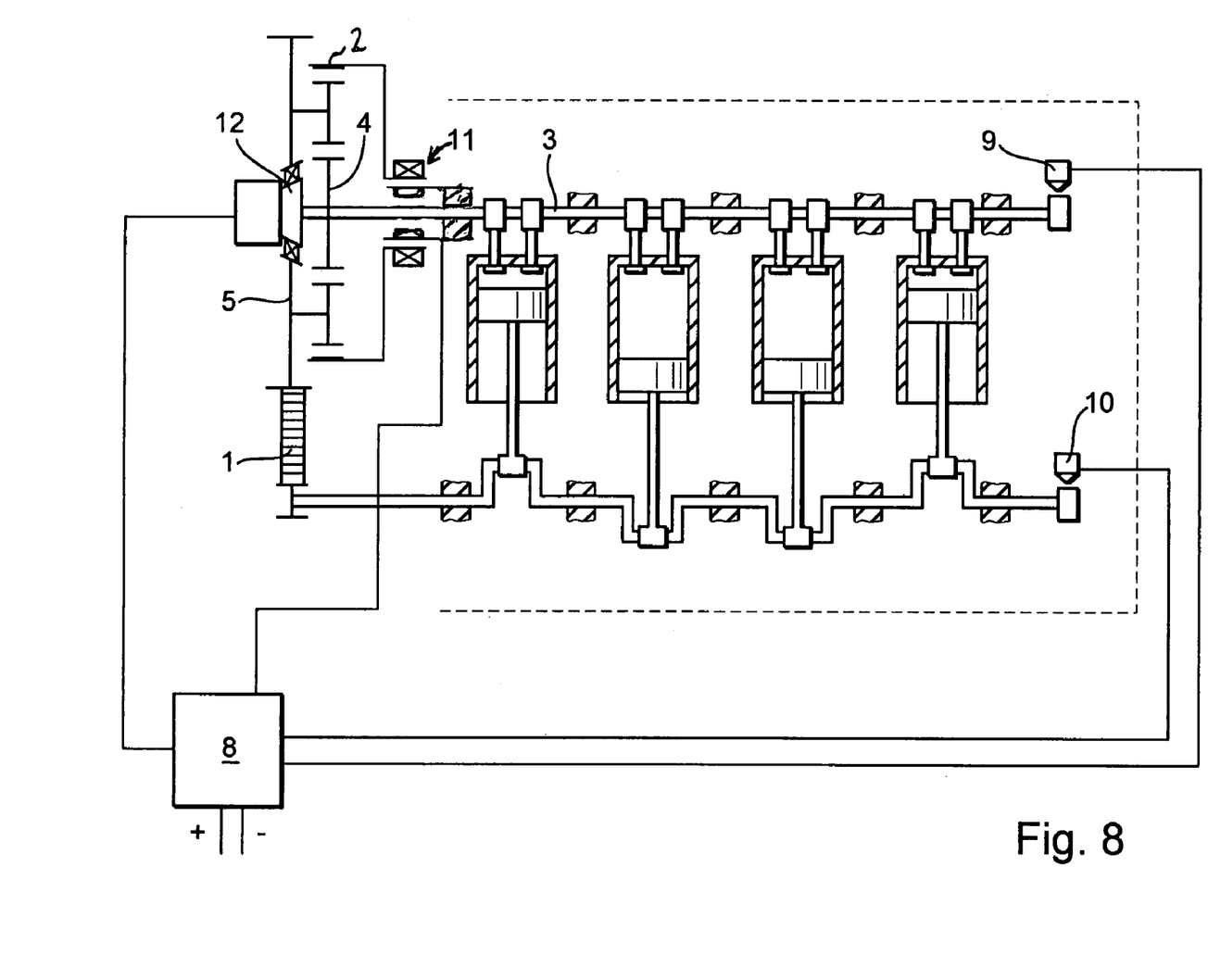
FIG. 8 shows a camshaft displacement by means of a planetary gear that is adjustable using drag torque.

In FIG. 8 toothed belt 1 or the chain drives planet gear link 5. Ring gear 2 is connected to a clutch 11. The other part of clutch 11 is fixed, being connected for example to the cylinder head. In the example, clutch 11 is in the form of an electromagnetic clutch. Clutch 11 may also be a hydraulic pump, to which an additional torque is applied by an adjustable throttle valve in the pressure line. A clutch 12 may establish a direct connection between the drive of planet gear carrier 5 and camshaft 3, which is attached to sun gear 4. If a preadjustment is now performed, a change in the phase position is achieved by engaging clutch 11 or disengaging clutch 12, because sun gear 4 and link 5 change the ratio of their rotational speeds for this time. The sun gear 4 turns faster, and the camshaft 3 runs ahead in its phase position. If no offset is desired, clutch 12 produces the connection between the link 5 (drive side) and the sun gear 4 (take-off side), and clutch 11 is not engaged. As a result, the entire planetary gear rotates at the speed of the toothed gear or chain (link drive), but in itself stands still, i.e. is locked since link 5 and sun gear 4 are clutched together. That is, the planet gears do not rotate and the entirely planetary gear emits no running noises and does not become worn. Thus it corresponds to a "normal" toothed belt or chain pulley with a non-activated planetary gear embedded. If a readjustment is to be performed, both clutches 11 and 12 may be disengaged. The camshaft 3 is decelerated through the drag torque of the camshaft 3 caused by friction and operation of the gas exchange valves. This causes it to rotate more slowly and results in a rotary motion of the ring gear 2, since the difference in rotational speed between the link 5 and the sun gear 4 causes the planet gears to rotate and drive the ring gear 2. With adjustment in both directions it is then possible, through measured operation of clutch 11 and simultaneous controlling of clutch 12, to control the adjusting process. This occurs through the fact that the actuating and regulating electronics 8 use the signals from the crankshaft sensor 10 and camshaft sensor 9 for the calculation and the clutches are actuated accordingly.

In an additional embodiment of the present invention, the camshaft adjuster is actuated by oil pressure. Such camshaft adjusters are described for example in patent applications DE 198 08 618 A1, which corresponds to U.S. Pat. No. 6,283,075, and DE 198 08 619 A1, which corresponds to U.S. Pat. No. 6,289,862, all four of which patent documents are hereby incorporated by reference herein. An alternate or addition object of the present invention is to make these camshaft adjusters more operationally reliable.

The adjusters described in the cited applications have a locking mechanism which is operated by the oil pressure needed to operate the adjuster. But if the oil pressure rises in an unsuitable manner, it may happen that the adjuster does not adjust despite the added oil pressure, because the locking system jams. The jamming comes about because the oil pressure changes too rapidly from the one operating side of the adjuster to the other. As a result the adjuster wants to move, and jams the locking device, which has not yet completely disengaged. The new method counters this effect in a suitable manner.

The electronic control recognizes whether an adjustment is beginning successfully or not. It defines a time window within which the adjuster must have shifted by a definable adjustment angle after it has been actuated by oil pressure. If the electronic control determines that this is not the case, it switches the oil pressure over again and starts a new attempt after a specifiable waiting time. Here the oil pressure is not switched from the one operating side of the adjuster to the other abruptly, as in a normal resetting, but slowly in the form of an adjustable ramp, with which the hydraulic valve that controls the oil pressure is actuated. The system that monitors whether the adjustment is successfully beginning then starts up again. If so, the control over the adjuster is turned over again to the "normal" regulator. If the adjustment is still not functioning, the slope of the ramp is reduced by a specifiable amount, so that the oil pressure builds up even more slowly. If this still does not work, the slope of the ramp is again reduced by the specifiable amount. That may continue until the slope of the ramp is zero. Then an error message is issued, which is either displayed visually on a connected computer or is forwarded as a signal to a higher-lever controller.

Another embodiment provides that if the controls of two or more adjusters on a V engine are for example in communication with each other or are running in the same control unit, the controller of the adjuster that jams emits a signal, whereupon the controller of the other adjuster sets it back and waits until the one adjuster is functioning again, so that the two are able to work relatively synchronously.

What is claimed is:

1. A method for increasing measuring accuracy for a limited path by using a measuring system having a sensor and a scale having path events, the method comprising the steps of:
during at least one learning phase, moving the sensor relative to the scale so as to form a map of actual geometric intervals of the path events; and
subsequent to the at least one learning phase, moving the sensor and the scale relative to each other and detecting the path events during a measuring phase, the path events being reproduced by the sensor as electric signals, and determining a measured path as a function of the detecting of the path events and the map.

2. The method as recited in claim 1 wherein during the at least one learning phase, the sensor is moved relative to the scale in a defined speed profile, and in connection with a constant time signal, a non-geometric representative of the interval between two path events of the path events is determined.

3. The method as recited in claim 2 wherein the non-geometric representative is determined from a speed of travel and a time between the two path events.

4. The method as recited in claim 2 wherein the defined speed profile is represented by a constant speed over the entire limited path.

5. The method as recited in claim in claim 1 during the at least one learning phase, the sensor is moved relative to the scale in a defined speed profile, and in connection with a constant time signal, a geometric representative of the interval between two path events is determined by calculating the distance traveled from the speed of travel and the time required between the two path events.

6. The method as recited in claim 1 wherein, during the measuring phase, intervals between the path events are determined via measured values either as time intervals or as distance intervals so as to define measuring phase characters, the measuring phase characters capable of be compared with identical characters from the map, so that the actual geometric distance traveled during the measuring phase is capable of being reconstructed as a function of stored map values and the measured values.

7. The method as recited in claim 1 wherein individual values of the map are stored in a memory in such a way that reconstruction of an actual sequence of path segments between the path events is possible.

8. The method as recited in claim 7 wherein the individual values of the map are stored in the memory in the order that corresponds to the actual sequence of the path segments between the path events.

9. The method as recited in claim 1 further comprising using a search algorithm to identify an individual value from the map in a memory that occurs only once.

10. The method as recited in claim 9 wherein a location found through the algorithm is provided with a digital mark.

11. The method as recited in claim 1 further comprising using a search algorithm to identify a sequence of values from the map in the memory that occurs only once.

12. The method as recited in claim 11 wherein the sequence is made up at least in part from non-adjacent values.

13. The method as recited in claim 11 wherein a location found through the algorithm is provided with a digital mark.

14. The method as recited in claim 1 wherein the limited path is made up from a straight path segment.

15. The method as recited in claim 1 wherein the limited path is made up from a full circle.

16. The method as recited in claim 1 wherein the electrical signals are postprocessed electronically.

17. The method as recited in claim 16 wherein the electrical signals are converted into square-wave signals.

18. The method as recited in claim 1 wherein stored values of the map are stored permanently in a digital memory.

19. The method as recited in claim 1 wherein stored values of the map are deletably stored in a digital memory.

20. The method as recited in claim 19 wherein when individual more exact values of the map exist, the more exact values are written over the inexact values.

21. The method as recited in claim 1 wherein the learning phase is run before each restart of the measuring phase.

22. The method as recited in claim 1 wherein the path events are random on the scale.

23. The method as recited in claim 1 wherein the path events on the scale have consistently decreasing or consistently increasing geometric intervals.

24. A device for carrying out the method as recited in claim 1 comprising the sensor and the scale, wherein the limited path is in the form of a straight path segment, and constitutes a distance sensor is used for example as a controller for electronic clutch management in a motor vehicle.

25. The device as recited in claim 24 wherein the distance sensor is an absolute distance sensor.

26. The device as recited claim 24 wherein the sensor is designed as a Hall sensor.

27. A device for carrying out the method as recited in claim 1 comprising the sensor and the scale, and wherein the limited path is in the form of a full circle so as to define a rotational angle sensor.

28. The device as recited in claim 27 wherein the device is placed on a crankshaft and/or camshaft to determine a rotational angle or rotational speed of a camshaft and/or crankshaft.

29. The device as recited in claim 28 wherein only every second path event of the crankshaft is utilized for a camshaft adjustment.

30. The device as recited claim 27 wherein the sensor is designed as a Hall sensor.

31. The device as recited in claim 27 wherein the full circle has trigger wheel is made of metal.

32. A device for performing the method as recited in claim 1 comprising the sensor and the scale, wherein only one interval between two adjacent path events has a different size than the intervals between the other path events.

33. The device as recited in claim 32 wherein the path events correspond to flanks of a trigger wheel.

34. The device as recited claim 32 wherein the sensor is designed as a Hall sensor.

35. A method for increasing measuring accuracy for a limited path by using a measuring system having a sensor and a scale having path events, the method comprising the steps of:

during at least one learning phase, moving the sensor relative to the scale so as to form first stored values, a map of actual geometric intervals of the path events over the limited path capable of being formed as a function of the first stored values; and subsequent to the at least one learning phase, moving the sensor and the scale relative to each other and detecting the path events during a measuring phase, second values corresponding to the path events during the measuring phase being generated as function of electric signals from the sensor; and determining a geometric location along the limited path of at least one of the path events detected during the measuring phase as a function of the first stored values and the second values.

36. The method as recited in claim 35 wherein the geometric location is an actual distance.

37. The method as recited in claim 35 wherein the geometric location is a rotational angle.

* * * * *